(12) United States Patent
Giroux et al.

(10) Patent No.: US 7,901,565 B2
(45) Date of Patent: Mar. 8, 2011

(54) REFORMING SULFUR-CONTAINING HYDROCARBONS USING A SULFUR RESISTANT CATALYST

(75) Inventors: Thomas Giroux, Madison, NJ (US); Earl Waterman, Iselin, NJ (US); Robert Joseph Farrauto, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 1196 days.

(21) Appl. No.: 11/456,718

(22) Filed: Jul. 11, 2006

(65) Prior Publication Data

US 2008/0011646 A1 Jan. 17, 2008

(51) Int. Cl.
*C10G 35/085* (2006.01)

(52) U.S. Cl. ......... 208/136; 208/138; 208/137; 208/244; 208/249

(58) Field of Classification Search .......................... None
See application file for complete search history.

(56) References Cited

U.S. PATENT DOCUMENTS

| | | | |
|---|---|---|---|
| RE34,250 E | 5/1993 | Van Leirsburg et al. | |
| 5,259,946 A | 11/1993 | Robinson et al. | |
| 5,322,615 A | 6/1994 | Holtermann et al. | |
| 5,507,939 A | 4/1996 | Russ et al. | |
| 5,518,607 A | 5/1996 | Field et al. | |
| 5,520,798 A | 5/1996 | Innes | |
| 5,540,833 A | 7/1996 | Larsen et al. | |
| 5,614,082 A | 3/1997 | Russ et al. | |
| 5,863,418 A | 1/1999 | Heyse et al. | |
| 6,153,089 A * | 11/2000 | Das et al. | 208/134 |
| 6,177,002 B1 * | 1/2001 | Glover | 208/64 |
| 6,238,816 B1 | 5/2001 | Cable et al. | |
| 6,541,419 B2 | 4/2003 | Shore et al. | |
| 6,790,432 B2 | 9/2004 | Ruettinger et al. | |
| 6,849,572 B2 | 2/2005 | Hwang et al. | |
| 6,913,739 B2 | 7/2005 | Shore et al. | |
| 6,977,067 B2 | 12/2005 | Hwang et al. | |
| 2004/0163312 A1 | 8/2004 | Bloomfield et al. | |
| 2004/0200758 A1 | 10/2004 | Yang et al. | |
| 2005/0229490 A1 | 10/2005 | Stevens et al. | |
| 2006/0140852 A1 | 6/2006 | Russell et al. | |

OTHER PUBLICATIONS

International Search Report for PCT/US 07/73263 dated Jan. 16, 2008.

* cited by examiner

*Primary Examiner* — Tam M Nguyen
(74) *Attorney, Agent, or Firm* — Bernard Lau

(57) ABSTRACT

A method of reforming a sulfur containing hydrocarbon involves contacting the sulfur containing hydrocarbon with a sulfur tolerant catalyst containing a sulfur tolerant precious metal and a non-sulfating carrier so that the sulfur tolerant catalyst adsorbs at least a portion of sulfur in the sulfur containing hydrocarbon and a low sulfur reformate is collected, and contacting the sulfur tolerant catalyst with an oxygen containing gas to convert at least a portion of adsorbed sulfur to a sulfur oxide that is desorbed from the sulfur tolerant catalyst.

22 Claims, 5 Drawing Sheets

REFORMING SULFUR-CONTAINING HYDROCARBONS USING A SULFUR RESISTANT CATALYST

TECHNICAL FIELD

The subject invention generally relates to reforming sulfur containing hydrocarbons without the need for in-process sulfur removal such as catalytic hydrodesulfurization or sulfur adsorbants.

BACKGROUND

Natural gas (of which the primary component is $CH_4$) contains lesser amounts of higher hydrocarbons such as alkanes and alkenes (or the general class of C2-C6+ hydrocarbons) which are prone, during catalytic processing such as pre-reforming and reforming reactions, to form coke deposits and deactivate the catalyst.

Coke formation often accompanies high temperature conversion processes that utilize hydrocarbon feed streams, and is detrimental to the operational efficiency of hydrocarbon reforming equipment. For example, the available reactive surface area of the reforming catalysts can be decreased by the undesirable deposition of coke on the surface of the catalyst. The deposition of coke on process equipment can also lead to inefficiencies in heat transfer, as well as unwanted pressure drops.

Difficulties associated with coke formation are of particular concern in reformers used for providing hydrogen to fuel cells since applications such as fueling stations and residential applications often mandate smaller scale reformer designs and a minimization of maintenance requirements. As such, equipment and maintenance provisions for the removal of coke that are available in an industrial setting such as in an ammonia plant are effectively unavailable for many fuel cell reformer applications.

The reforming or pre-reforming of ethane, as a surrogate for higher hydrocarbons is shown in the equations below.

Reforming: $C_2H_6 + 2H_2O \leftrightarrow 5H_2 + 2CO$

Pre-Reforming: $C_2H_6 + 2H_2O \leftrightarrow 3H_2 + CO(CO_2) + CH_4$

Reforming is practiced in chemical plants designed to maximize the production of $H_2$ and CO from all hydrocarbons present in the feed while pre-reforming is mainly practiced at lower temperatures than reforming primarily to remove higher hydrocarbon coke precursors forming CO, $H_2$, and $CH_4$. Both pre-reforming and reforming can be practiced at a variety of pressures. Reduced nickel catalysts (such as $Ni/Al_2O_3$) are commonly used for reforming reactions. However, nickel catalysts are highly susceptible to deactivation by small amounts of sulfur present in the feed. Deactivation is caused by nickel sulfide (NiS) formation which poisons the active Ni metal sites over time. The active Ni metal sites cannot be conveniently regenerated, and thus the deactivation process is essentially irreversible. Consequently, it is common practice to desulfurize the hydrocarbon feed prior to reforming. The hydrocarbon feed is desulfurized by catalytic hydrodesulfurization using Co, $Mo/Al_2O_3$ catalysts at temperatures in excess of 350° C. and pressures above 300 psig. One concern with such a catalytic hydrodesulfurization is the production hydrogen sulfide ($H_2S$) which is then adsorbed on ZnO downstream in the following manner.

Hydrodesulfurization:

$H_2 + R-S \xleftrightarrow{\text{catalyst}} H_2S + R-H$ $H_2S$ adsorption:

$H_2S + ZnO \leftrightarrow Zn-S + H_2O$

The necessity for sulfur removal is a critical limitation with the reforming process to avoid poisoning of downstream catalysts and equipment and thus large volumes of ZnO or other suitable adsorbents must be present in the process stream upstream from the reformer. These adsorbents have limited capacities for adsorbing hydrogen sulfide, and thus the adsorbents must be replaced frequently. The capacity of an adsorbent for adsorbing hydrogen sulfide is decreased with $H_2O$ in the feed gas, as well as temperature. The presence of an adsorbent in the process stream adds significantly to the overall pressure drop and process complications. This process is quite complicated and requires costly regeneration or disposal of the catalyzed-reactive hydrodesulfurization bed and replacement of sulfur saturated ZnO.

Furthermore, sulfur removal is an important aspect in petroleum refining processes such as catalytic reforming, which play an integral role in upgrading straight run or cracked naphtha feedstocks, as by increasing the octane number of the gasoline fraction contained in such feedstocks. To achieve maximum run lengths and increase process efficiency, it is generally recognized that the sulfur content of the feedstock must be minimized. Reforming catalysts, and particularly those comprising platinum, and most particularly comprising platinum and rhenium, deactivate rapidly in the presence of sulfur compounds, and as a result, it is necessary to reduce the sulfur content of reformer feedstocks as low as possible.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for efficient reforming of sulfur containing hydrocarbons without the need for in-process sulfur removal such as catalytic hydrodesulfurization or sulfur adsorbants. Intermittent or continuous reforming methods may be employed.

Aspects of the invention relate to systems and methods of reforming a sulfur containing hydrocarbon involving contacting the sulfur containing hydrocarbon with a sulfur tolerant catalyst containing a sulfur tolerant precious metal and a non-sulfating carrier so that the sulfur tolerant catalyst adsorbs at least a portion of sulfur comprised in the sulfur containing hydrocarbon and a low sulfur reformate is collected. Periodically, the sulfur tolerant catalyst is contacted with a gas containing oxygen to convert at least a portion of adsorbed sulfur to a sulfur oxide that is desorbed and removed from the sulfur tolerant catalyst and specifically the non-sulfating carrier. The resultant sulfur oxide can be discharged to the atmosphere or adsorbed in an alkaline media dependent on local emission regulations.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Hydrocarbon steam reforming, performed with a new process and sulfur tolerant catalysts, simplifies the entire pre-reforming and/or reforming operation by eliminating the need for in-process sulfur removal such as catalytic hydrodesulfurization and/or adsorption of sulfur compounds by ZnO. One aspect of the invention is the use of a sulfur tolerant reforming catalyst which can adsorb sulfur compounds, while continuing to reform the hydrocarbons. The invention allows for periodic sulfur removal from the sulfur tolerant reforming catalyst without substantial loss in activity or selectivity. The invention can be carried out in a simple reactor or a commonly used swing reactor. A swing reactor involves one reactor reforming while a parallel reactor is off-stream and the adsorbed sulfur compounds on the sulfur tolerant catalyst are catalytically oxidized by a pulse of $O_2$ liberating sulfur oxide such as $SO_2/SO_3$. The sulfur oxide is either vented to the atmosphere or easily adsorbed in an alkaline scrubber but external to the reforming process stream. Thus sulfur removal has no direct impact on the process reformate stream.

Figure 1:
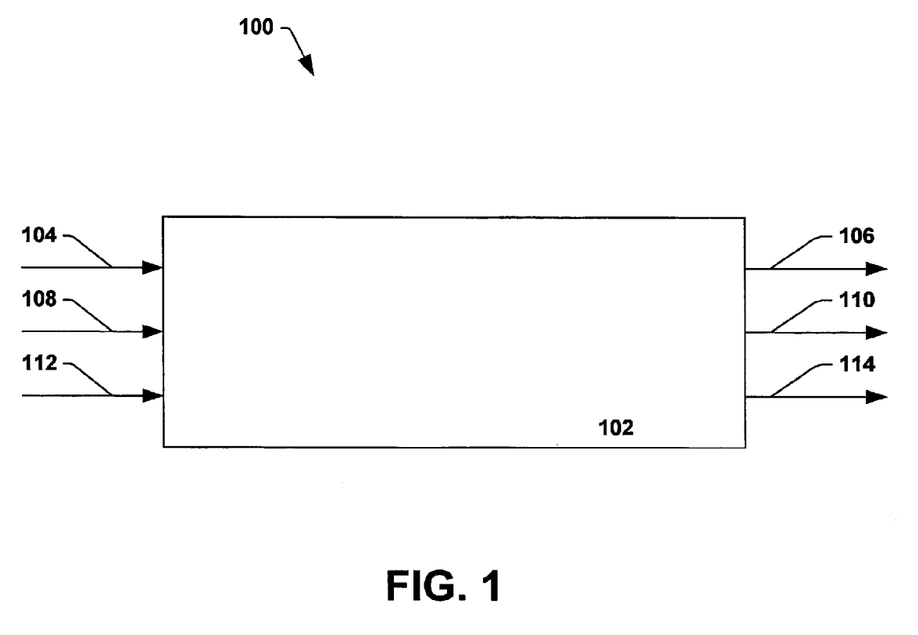
FIG. 1 illustrates a schematic diagram of a system of reforming a sulfur containing hydrocarbon feed and desulfurizing a sulfur tolerant catalyst in one aspect of the invention.

Referring to FIG. 1, a high level schematic diagram of a system 100 of reforming a sulfur containing hydrocarbon feed and desulfurizing/regenerating a sulfur tolerant catalyst in one aspect of the invention is shown. The system 100 contains a sulfur tolerant catalyst in a reactor vessel 102. The reactor vessel 102 may have one or more inlets, such as three inlets, inlet 104 for injecting a sulfur containing hydrocarbon, inlet 108 for injecting steam, and inlet 112 for injecting a gas containing oxygen. The reactor vessel 102 may one or more outlets, such as three inlets, outlet 106 for collecting reformate, outlet 110 for collecting combustible species, and outlet 114 for collecting a sulfur oxide.

A sulfur containing hydrocarbon is injected through inlet 104. If the sulfur containing hydrocarbon is not previously mixed with steam, then steam is also injected through inlet 108. Suitable reforming conditions are established and maintained, and reformate is collected via outlet 106. The sulfur tolerant reforming catalyst has the ability to adsorb sulfur compounds present in the sulfur containing hydrocarbon. After a given time, but before the sulfur tolerant catalyst becomes saturated with sulfur and begins losing too much activity it becomes desirable to regenerate the sulfur tolerant catalyst in the reactor vessel 102. The flow of sulfur containing hydrocarbon through inlet 104 is terminated, and optionally steam is injected through inlet 108 to purge the reactor vessel 102 combustible species. If present, the combustible species can be collected at outlet 110. A gas containing oxygen is then injected through inlet 112. The gas containing oxygen catalytically oxidizes the adsorbed sulfur compounds associated with the sulfur tolerant catalyst and converts them to a sulfur oxide thereby releasing the adsorbed sulfur compounds from the sulfur tolerant reforming catalyst. The sulfur oxide can be collected via outlet 114.

Hydrocarbon reforming involves converting hydrocarbons to at least one of and typically at least two of $CH_4$, $H_2$, $CO_2$, and CO. Examples of hydrocarbons that can be reformed include natural gas, alkanes containing from about 1 to about 12 carbon atoms and especially alkanes containing from about 1 to about 4 carbon atoms, alkenes containing from about 1 to about 12 carbon atoms and especially alkenes containing from about 1 to about 4 carbon atoms, aromatics containing from about 1 to about 16 carbon atoms such as naphtha, LPGs such as HD-5 LPG containing propane and propylene, diesel, gasoline, fossil fuels, jet fuel, and logistical fuels.

The hydrocarbons processed in accordance with the invention contain some sulfur, typically via a sulfur compound. Accordingly, the hydrocarbons processed in accordance with the invention are sulfur containing hydrocarbons. Examples of sulfur compounds include sulfur, hydrogen sulfide, carbonyl sulfide, carbon disulfide, thiophenes, mercaptans, sulfur oxides, sulfates, and sulfides. Sulfides include organic disulfides or inorganic compounds such as carbon monosulfides. The sulfur containing hydrocarbon feed may or may not contain water.

The sulfur containing hydrocarbon feed contains steam in addition to the sulfur containing hydrocarbon to facilitate reforming. In one embodiment, the sulfur containing hydrocarbon feed contains about 1% or more and about 99% or less of steam and about 1% or more and about 99% or less of the sulfur containing hydrocarbon. In another embodiment, the sulfur containing hydrocarbon feed contains about 10% or more and about 90% or less of steam and about 10% or more and about 90% or less of the sulfur containing hydrocarbon. In yet another embodiment, the sulfur containing hydrocarbon feed contains about 30% or more and about 80% or less of steam and about 20% or more and about 70% or less of the sulfur containing hydrocarbon. In this paragraph, % refers to % by volume.

The sulfur containing hydrocarbon feed alternatively contains steam and sulfur containing hydrocarbon in a steam to carbon ratio to facilitate reforming. In one embodiment, the sulfur containing hydrocarbon feed contains a steam to carbon ratio about 0.1 to about 10. In another embodiment, the sulfur containing hydrocarbon feed contains a steam to carbon ratio about 0.5 to about 5.

The terms reforming or steam reforming as used herein are intended to include all types of reforming reactions. Generally speaking, two commonly used reforming operations are high-temperature steam-reforming and moderate temperature pre-reforming. High-temperature steam-reforming tends to produce at least one of and typically at least two of $H_2$, $CO_2$, and CO while moderate temperature pre-reforming tends to produce at least one of and typically at least two of $CH_4$, $H_2$, $CO_2$, and CO. High-temperature steam-reforming involves contacting a sulfur containing hydrocarbon feed with a reforming catalyst at temperatures of about 550° C. or more and about 900° C. or less and a pressure of about 1 atmosphere or more consistent with thermodynamics. In another embodiment, high-temperature steam-reforming involves contacting a sulfur containing hydrocarbon feed with a reforming catalyst at temperatures of about 600° C. or more and about 800° C. or less and a pressure of about 1 atmosphere or more or of about 1.1 atmosphere or more consistent with thermodynamics.

Moderate temperature pre-reforming involves contacting a sulfur containing hydrocarbon feed with a pre-reforming catalyst at temperatures of about 300° C. or more and about 550° C. or less and a pressure of about 1 atmosphere or more consistent with thermodynamics. In another embodiment, moderate temperature pre-reforming involves contacting a sulfur containing hydrocarbon feed with a pre-reforming catalyst at temperatures of about 400° C. or more and about 500° C. or less and a pressure of about 1 atmospheres or more or of about 1.1 atmospheres or more consistent with thermodynamics. The sulfur containing hydrocarbon feed in pre-reforming contains a fraction of the hydrocarbon with at least two carbon atoms.

The sulfur containing hydrocarbon feed gas is reformed over a sulfur tolerant precious metal catalyst which adsorbs the sulfur compounds while retaining its activity. Periodically the adsorbed sulfur is removed using a short air purge that catalytically converts the adsorbed sulfides to sulfur oxide which is easily scrubbed external to the process stream.

Reforming Rxns:

Adsorption on PM catalyst:

Catalyst + SC ⟶ (Catalyst-SC)

External Regeneration with PM catalyst

In the above reactions, SC is a sulfur compound, m and n are individually integers from about 1 to about 25.

Examples of a sulfur tolerant catalyst include a sulfur tolerant precious metal deposited on a non-sulfating carrier. A sulfur tolerant catalyst has a catalytic activity that is hindered reversibly as a result of contact with sulfur compounds in the sulfur containing hydrocarbon feed gas. Insubstantial levels of catalytic activity degradation may be acceptable. Thus, as used herein the definition of a sulfur tolerant catalyst is one whose activity is hindered but not permanently lost by the adsorption of sulfur compounds, as the sulfur tolerant catalyst can be regenerated. Also as used herein the definition of a non-sulfating carrier or support is a carrier that does not react to form sulfates.

The sulfur tolerant precious metal includes at least one of Pt, Pd, Rh, and Ir, and the like. In another embodiment, the sulfur tolerant precious metal includes at least two of Pt, Pd, Rh, and Ir. Other catalytic metals or promoters may additionally be included. Non-sulfating carriers contain at least one of silica, zirconia, and titania. Examples of non-sulfating carriers include or contain $SiO_2$, $ZrO_2$, $SiO_2$—$ZrO_2$, $TiO_2$, $SiO_2$—$TiO_2$, $ZrO_2$—$TiO_2$, $CeO$—$ZrO_2$, $LaO$—$ZrO_2$, $YO$—$ZrO_2$, zeolite materials (alumino-silicates), combinations thereof, and the like. An example of sulfating carrier is alumina which forms $Al_2(SO_4)_3$, and thus in one embodiment, the non-sulfating carriers do not contain alumina.

Optionally, other additives (transition metal compounds, stabilizers, binders, promoters, etc.) may be added to the sulfur tolerant catalysts to enhance the capacity for adsorption and/or improve other characteristics, so long as the ability to adsorb/desorb sulfur is not compromised. Some additives may promote the formation of chemisorbed surface sulfides during reforming which have the ability to decompose to $SO_2/SO_3$ during the $O_2$ pulse.

The sulfur tolerant catalyst contains a sufficient amount of sulfur tolerant precious metal to effect a reforming reaction. In one embodiment, the sulfur tolerant catalyst contains about 0.1% by weight or more and about 20% by weight or less of sulfur tolerant precious metal and about 80% by weight or more and about 99.9% by weight or less of a non-sulfating carrier. In another embodiment, the sulfur tolerant catalyst contains about 0.5% by weight or more and about 10% by weight or less of sulfur tolerant precious metal and about 90% by weight or more and about 99.5% by weight or less of a non-sulfating carrier.

The non-sulfating carriers have a relatively high surface area to both disperse the precious metal and adsorb sulfur compounds. In one embodiment, the surface area of the non-sulfating carriers is about 25 m$^2$/g or more and about 300 m$^2$/g or less. In another embodiment, the surface area of the non-sulfating carriers is about 50 m$^2$/g or more and about 250 m$^2$/g or less. In yet another embodiment, the surface area of the non-sulfating carriers is about 75 m$^2$/g or more and about 200 m$^2$/g or less.

The sulfur tolerant catalyst is made by contacting and/or mixing the sulfur tolerant precious metal and the non-sulfating carrier. For example, the sulfur tolerant catalyst may be made by contacting a non-sulfating carrier with a solution containing platinum and rhodium. Alternatively, the sulfur tolerant catalyst may be made by contacting a non-sulfating carrier with a first solution of a first sulfur tolerant precious metal such as platinum, followed by or simultaneously contacting the non-sulfating carrier with a second solution of a second sulfur tolerant precious metal such as rhodium (and/or a third solution with a third sulfur tolerant precious metal). The solution of sulfur tolerant precious metal may contain one or more sulfur tolerant precious metals, or two or more sulfur tolerant precious metals.

When the sulfur tolerant precious metal and the non-sulfating carrier are contacted in solution, depending upon the amount of solution used and the wettability of the non-sulfating carrier, either a wet powder or a slurry is formed. A slurry can be optionally ball milled, then dried at a suitable temperature for a suitable period of time to yield a sulfur tolerant catalyst in powder form. In one embodiment, drying involves exposing the slurry in a chamber such as an oven to a temperature of about 30° C. or more and about 125° C. or less for a time from about 10 minutes to about 30 hours. In another embodiment, drying involves exposing the slurry in a chamber such as an oven to a temperature of about 40° C. or more and about 100° C. or less for a time from about 30 minutes to about 20 hours.

Various additives may be charged into the slurry or wet powder to facilitate formation of the sulfur tolerant catalyst in desired form (such as a formed shape or coating on a monolith substrate). Examples of such additives include binders, pH adjusters, drying agents, and the like.

The slurry contains a suitable amount of solids to form the sulfur tolerant catalyst in desired form, such as either a formed shape or a coating on a monolith substrate. In one embodiment, the slurry contains about 5% or more and about 95% or less of solids. In another embodiment, the slurry contains about 10% or more and about 90% or less of solids.

The sulfur tolerant catalyst may be heated at elevated temperatures for a suitable period of time before or after it is formed into any desired shape or before or after it is coated onto a substrate. In one embodiment, the sulfur tolerant catalyst is heated at a temperature of about 100° C. or more and about 850° C. or less for a time from about 10 minutes to about 50 hours. In another embodiment, the sulfur tolerant catalyst is heated at a temperature of about 200° C. or more and about 700° C. or less for a time from about 30 minutes to about 10 hours. In one embodiment, the optional heating may involve calcining the sulfur tolerant catalyst.

The sulfur tolerant catalyst can be in any form such as in particulate form (e.g., beads, pellets, powders, rods, quadralobes, etc.) or in washcoat compositions deposited on monolith substrates such as honeycomb monolith substrates or on metallic heat exchangers.

The sulfur tolerant catalyst may be formed on a monolith substrate or heat exchanger using a single catalyst layer, a double catalyst layer, or a triple catalyst layer. Other layered configurations, such as zoned or graded configurations will be readily apparent to those of skill in the art, and include those disclosed U.S. Pat. No. 6,436,363, which is hereby incorporated by reference. The washcoat compositions used to form the layers of the sulfur tolerant catalyst typically contain a non-sulfating carrier impregnated with a sulfur tolerant precious metal optionally with other components.

In one embodiment, the monolith substrate is of the type comprising one or more monolithic bodies having a plurality of finely divided gas flow passages extending therethrough. Such monolith substrates are often referred to as "honeycomb" type substrates and are well known. The monolith substrate may be made of a refractory, substantially inert, rigid material which is capable of maintaining its shape and a sufficient degree of mechanical conditions at high temperatures, such as about 1400° C. Typically, a material is selected for use as the monolith substrate which exhibits a low thermal coefficient of expansion, good thermal shock resistance and low thermal conductivity.

Two general types of materials of construction for monolith substrates are readily available. One general type is a ceramic-like porous material composed of one or more metal oxides, e.g., alumina, alumina-silica, alumina-silica-titania, mullite, cordierite, zirconia, zirconia-cena, zirconia-spinel, zirconia-mullite, siliconcarbide, etc. Monolith substrates are commercially available in various sizes and configurations. The monolithic substrate may contain, for example, a cordierite member of generally cylindrical configuration (either round or oval in cross section) and having a plurality of parallel gas flow passages of regular polygonal cross sectional extending therethrough. The gas flow passages are typically sized to provide from about 50 to about 1,200 gas flow channels per square inch of face area. In another embodiment, the gas flow passages are typically sized to provide from about 200 to about 600 gas flow channels per square inch of face area.

The second general type of material of construction for the monolith substrate is a heat- and oxidation-resistant metal, such as stainless steel or an iron-chromium alloy. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, such as from about 200 to about 600 gas flow channels per square inch of face area. In another embodiment, the gas flow passages are typically sized to provide from about 200 to about 600 gas flow channels per square inch of face area.

In another embodiment, the monolith substrate is present in the form of a ceramic foam or metal foam. Monolith substrates in the form of foams are well known, e.g., see U.S. Pat. No. 3,111,396 and SAE Technical Paper 971032, entitled "A New Catalyst Support Structure For Automotive Catalytic Converters" (February 1997), both of which are hereby incorporated by reference.

In yet another embodiment, the sulfur-tolerant catalyst is coated as a washcoat composition on a monolith substrate which is in the form of a heat exchanger. A heat exchanger substrate can be a shell-and-tube exchanger, a crossflow monolith or a fin-type exchanger of the type commonly employed in automobile radiators.

The sulfur tolerant catalyst layer can be deposited directly on the surface of the monolith substrate. In the case of metallic honeycombs or heat exchangers, however, a binder coating can be deposited on the surface of a metallic substrate interposed between the surface of the monolithic substrate and the sulfur tolerant catalyst layer. Such binder coating is typically present in an amount of up to about 1 $g/in^3$ of the monolith substrate and may contain a high surface area material such as silica.

After a predetermined amount of time of reforming, the sulfur tolerant catalyst in the reaction chamber or vessel adsorbs a maximum amount of sulfur. At this time or before, the adsorbed sulfur is removed from the sulfur tolerant catalyst in a separate process act by contacting the sulfided sulfur tolerant catalyst with a gas containing oxygen to convert at least a portion of adsorbed sulfur to a sulfur oxide that is desorbed from the sulfur tolerant catalyst external to the reforming process act.

Optionally after contacting the sulfur tolerant catalyst with the sulfur containing hydrocarbon and before contacting the sulfided sulfur tolerant catalyst with a gas containing oxygen, the sulfided sulfur tolerant catalyst is contacted with steam. That is, a steam purge can be injected into the reaction chamber or vessel to remove combustible gases to mitigate possible complications in regenerating the sulfur tolerant catalyst.

The steam purge is conducted at a temperature low enough to avoid substantial desorption of sulfur compounds. In one embodiment, the steam purge is conducted at about 600° C. or less. In another embodiment, the steam purge is conducted at about 500° C. or less. In yet another embodiment, the steam purge is conducted at about 400° C. or less.

The steam purge is conducted for a sufficient time to remove combustible gases from the reaction chamber or vessel. In one embodiment, the steam purge is conducted for a time of about 0.1 second or more and about 20 minutes or less. In another embodiment, the steam purge is conducted for a time of about 1 second or more and about 10 minutes or less. In yet another embodiment, the steam purge is conducted for a time of about 10 seconds or more and about 5 minutes or less.

The gas containing oxygen contains at least oxygen, and may contain other components such inert gases, steam, ozone, carbon dioxide, and the like. Inert gases include nitrogen, helium, neon, argon, krypton, and xenon. An example of an inexpensive oxygen containing gas is air. In one embodiment, the gas contains at least about 5% by volume oxygen. In another embodiment, the gas contains at least about 10% by volume oxygen. In yet another embodiment, the gas contains at least about 20% by volume oxygen.

In a regenerating act the adsorbed sulfur is catalytically converted by the precious metal sulfur tolerant catalyst by the addition of $O_2$ to a sulfur oxide, such as $SO_2$ and/or $SO_3$. The sulfur oxide(s) can be emitted to the atmosphere or treated, for example, scrubbed in an alkaline solution, and then emitted. To regenerate the sulfided catalyst, a relatively short pulse of an oxygen containing gas is contacted with the sulfur tolerant catalyst containing the adsorbed sulfur. In one embodiment, air is injected into the reaction chamber to produce easily scrubbed sulfur oxide external to the process stream. It should be noted that steam alone is not sufficient to remove adsorbed sulfur from the sulfided sulfur tolerant catalyst at about 500° C.

The gas containing oxygen is contacted with the sulfided sulfur tolerant catalyst at a temperature to promote catalytic conversion of a majority of the adsorbed sulfur compounds to a sulfur oxide. In one embodiment, the oxygen containing gas is contacted with the sulfided sulfur tolerant catalyst at a temperature of about 200° C. or more and 800° C. or less. In another embodiment, the oxygen containing gas is contacted with the sulfided sulfur tolerant catalyst at a temperature of about 300° C. or more and 700° C. or less. In yet another embodiment, the oxygen containing gas is contacted with the sulfided sulfur tolerant catalyst at a temperature of about 400° C. or more and 600° C. or less. Majority means at least 50% by weight.

The gas containing oxygen is contacted with the sulfided sulfur tolerant catalyst for a sufficient time to promote conversion of a majority of the adsorbed sulfur compounds to a sulfur oxide. The time may vary greatly in different embodiments and depends upon a number of factors including the amount of oxygen in the oxygen containing gas, the level of regeneration desired, and the like. In one embodiment, the oxygen containing gas is contacted with the sulfided sulfur tolerant catalyst for a time of about 1 second or more and about 30 minutes or less. In another embodiment, the steam purge is conducted for a time of about 10 seconds or more and about 10 minutes or less. In yet another embodiment, the steam purge is conducted for a time of about 20 seconds or more and about 5 minutes or less.

The sulfur oxide(s) released is disposed of in any suitable manner. For example, the sulfur oxide is can be vented to the atmosphere, collected and stored for a subsequent use, adsorbed in a scrubber, such as an alkaline scrubber. Generally speaking, disposal of the sulfur oxide is external to the reforming process.

As a result of the desulfurizing aspect of the invention, the reforming products produced are low sulfur reformates in that the reformate contains a markedly smaller amount of sulfur that the sulfur containing hydrocarbon feed.

In one embodiment, the low sulfur reformate (at least one of and typically at least two of $CH_4$, $H_2$, $CO_2$, and CO) contains about 20% or less of the amount of sulfur in the sulfur containing hydrocarbon feed. In another embodiment, the low sulfur reformate contains about 10% or less of the amount of sulfur in the sulfur containing hydrocarbon feed. In yet another embodiment, the low sulfur reformate contains about 5% or less of the amount of sulfur in the sulfur containing hydrocarbon feed.

In one embodiment, the low sulfur reformate (at least one of and typically at least two of $CH_4$, $H_2$, $CO_2$, and CO) contains less than about 0.1 ppm of sulfur (or sulfur containing compounds). In another embodiment, the low sulfur reformate contains less than about 0.01 ppm of sulfur. In yet another embodiment, the low sulfur reformate contains less than about 0.001 ppm of sulfur. In still yet another embodiment, the low sulfur reforming products produced contain no detectable sulfur.

Figure 2:
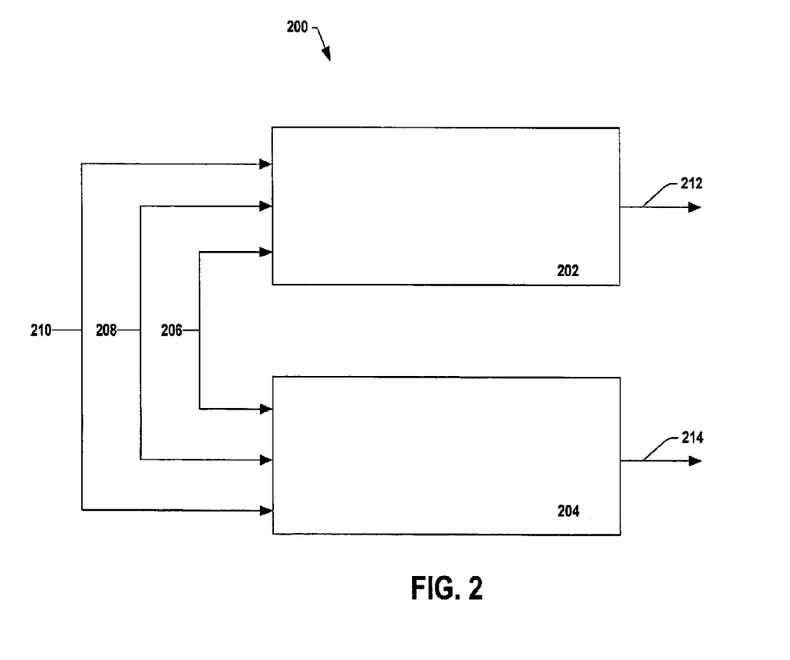
FIG. 2 illustrates a schematic diagram of a system of reforming a sulfur containing hydrocarbon feed and desulfurizing/regenerating a sulfur tolerant catalyst in another aspect of the invention.

Referring to FIG. 2, a swing reactor system/operation 200 is shown demonstrating the efficient and simultaneous reforming of a sulfur containing hydrocarbon feed and desulfurizing/regenerating the sulfur tolerant catalyst. The swing reactor system/operation 200 has two vessels or reactors 202 and 204 that contain sulfur tolerant catalyst. The sulfur tolerant catalyst in vessels 202 and 204 may be the same or different.

The sulfur containing hydrocarbon feed gas enters through line 206 into vessel 202 and is reformed and the reformate is collected via line 212. The sulfur compounds present in the sulfur containing hydrocarbon feed gas are adsorbed onto the sulfur tolerant catalyst without showing any evidence of catalyst deactivation. After a predetermined time on stream the sulfur containing hydrocarbon feed gas is diverted to parallel vessel 204 to continue the reforming process. An optional purge of steam is sent through line 208 through vessel 202 to remove combustible gases. A relatively short pulse of air is injected through line 210 into the steam flowing into vessel 202 after or with the steam flowing into vessel 202 and consequently the adsorbed sulfur compounds are catalytically converted to a mixture of $SO_2/SO_3$ which desorbs from the sulfur tolerant catalyst. The sulfur oxide mixture is vented to the atmosphere through line 212.

During the optional purge and air injection into vessel 202, reforming and simultaneously desulfurization of the sulfur containing hydrocarbon feed gas is occurring in vessel 204. The sulfur containing hydrocarbon feed gas is then redirected back into vessel 202 while sulfur removal and regeneration occurs in vessel 204 completing the total swing cycle. Thus, an intermittent process (FIG. 1) or a continuous process (FIG. 2) for reforming a sulfur containing hydrocarbon feed may be conducted.

Figure 3:
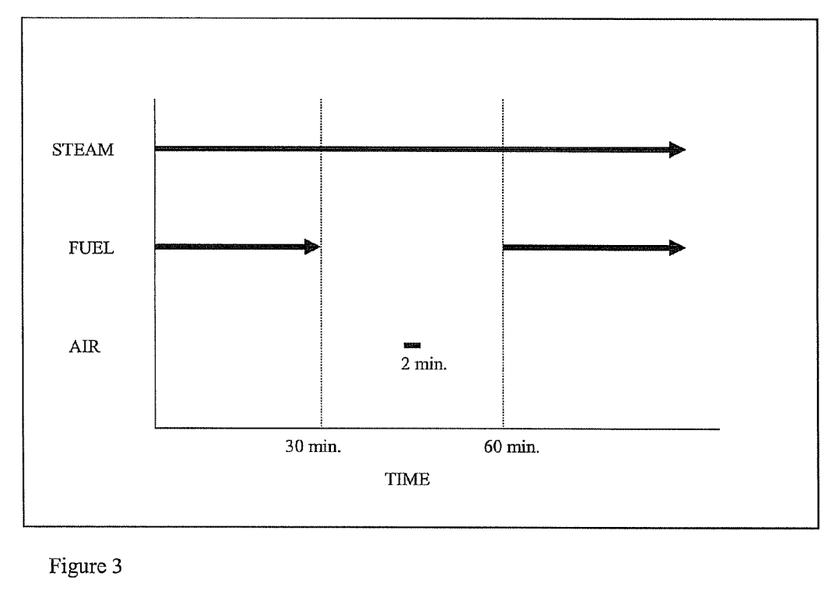
FIG. 3 illustrates a graphical diagram of process acts for reforming a sulfur containing hydrocarbon feed and desulfurizing/regenerating a sulfur tolerant catalyst in one aspect of the invention.

FIG. 3 shows one embodiment of the sequence of process acts for reforming and regeneration. Steam may be continuously injected in to the reactor and contacted with the sulfur tolerant catalyst, while either a sulfur containing hydrocarbon feed, and gas containing oxygen, nothing, or an inert gas are additionally contacted with the sulfur tolerant catalyst. In this context, the optional steam purge is conducted by terminating injection of any other gas into the reactor, except for flow through the steam line. The process acts of FIG. 3 are used to generate the data in FIGS. 4-7, as discussed below.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Either a silica-zirconia carrier available from Magnesium Electron, Inc. of Flemington, N.J. or gamma alumina was mixed with nitrate salts of platinum and rhodium in an aqueous solution to impregnate the carrier with platinum and rhodium. The mixtures were dried at about 100° C. and subjected to calcination in air at about 500° C.

Figure 4:
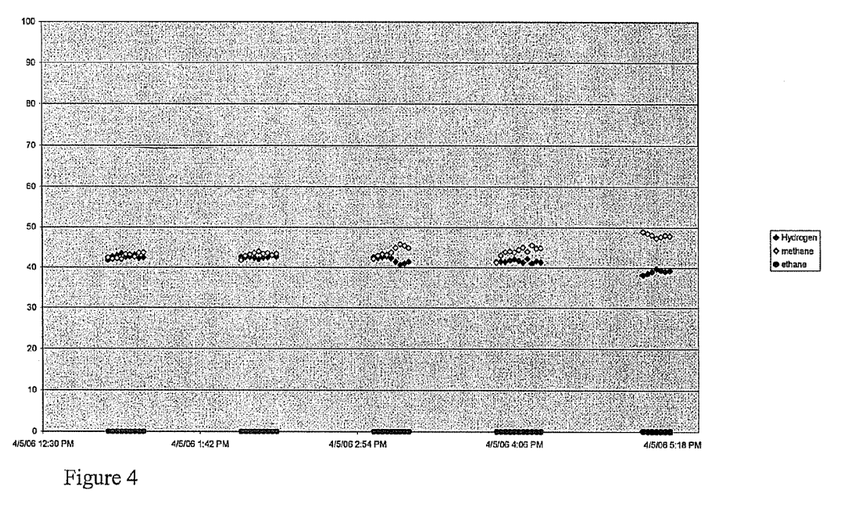
FIG. 4 illustrates a graphical diagram of reformate compositions in methods in accordance with an aspect of the invention.

FIG. 4 demonstrates the reforming of sulfur-containing natural gas containing methane and higher hydrocarbons on Day 1. The y-axis represents the mole % of the reformate products. Compositions are dry gas. FIG. 4 demonstrates the reforming of sulfur containing pipeline natural gas containing methane, ethane, and higher hydrocarbons at 500° C. utilizing the sulfur tolerant catalyst (Pt,Rh/$SiO_2$/$ZrO_2$) catalyst and related methodology of the invention at atmospheric pressure. The process acts used to generate the data are shown in FIG. 3.

Figure 5:
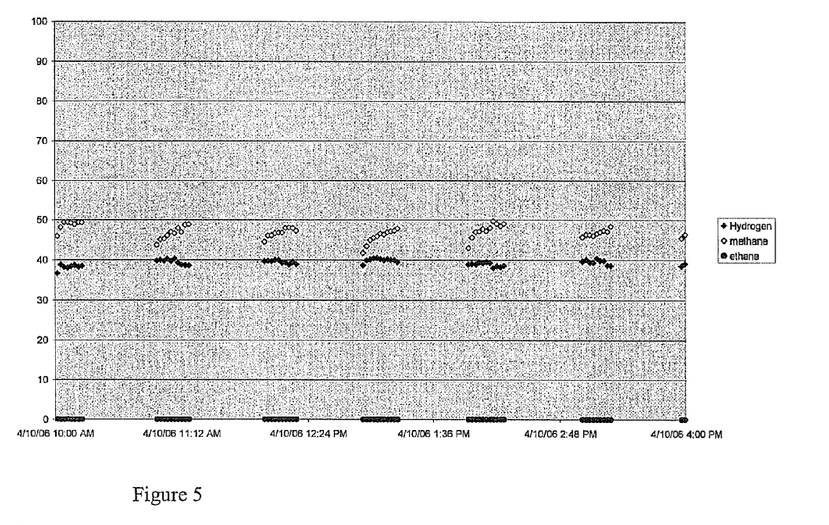
FIG. 5 illustrates a graphical diagram of reformate compositions in methods in accordance with an aspect of the invention.

FIG. 5 demonstrates the reforming of sulfur-containing natural gas containing methane and higher hydrocarbons on Day 6 using the catalyst of Example 3. The y-axis represents the mole % of the reformate products. Compositions are dry gas. Pipeline natural gas containing greater than 90% methane, with the balance being higher hydrocarbons, especially ethane, with sulfur content varying from 0.5 to 2.5 ppm was mixed with steam (steam/carbon=1.4) at 500° C. inlet temperature and atmospheric pressure. Ethane conversion is shown as a surrogate for all higher hydrocarbons because it is the most difficult to steam reform excluding methane. Throughout the entire reforming process of FIG. 4 the ethane is completely converted, the produced hydrogen is essentially constant and the methane shows a slight increase indicating a steady decrease in methane conversion likely due to the adsorption of sulfur and the possibility of some methanation. After the $O_2$ purge the activity as measured by the $H_2$ generated returns to its constant value showing reversibility. If the reforming process described in the invention is allowed to continue for 5 days (FIG. 5) the $H_2$ generation remains high demonstrating the stability of the sulfur resistant catalyst and the effectiveness of the process.

Figure 6:
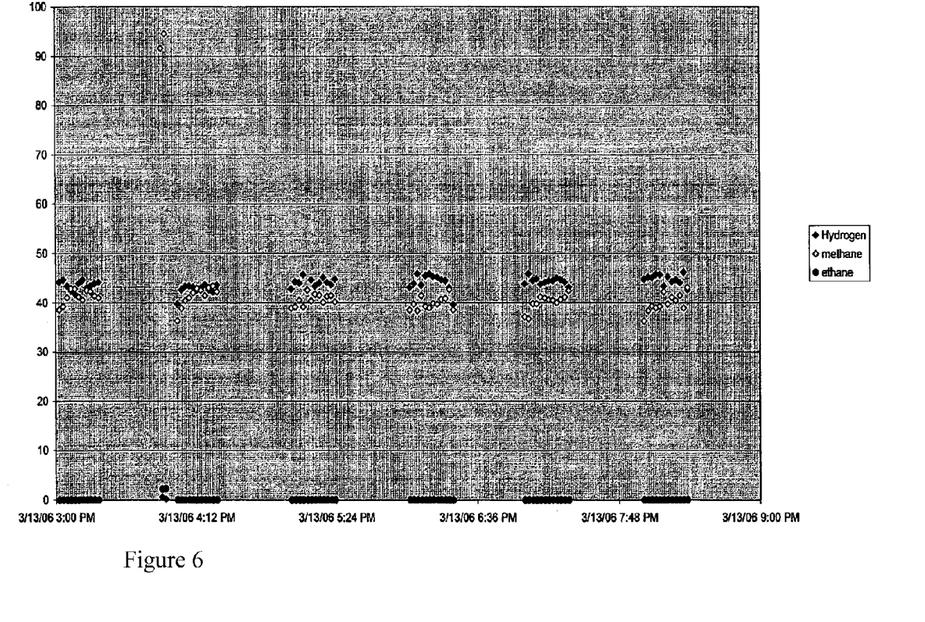
FIG. 6 illustrates a graphical diagram of reformate compositions in methods outside the scope of the invention. Here $Al_2O_3$, a sulfating carrier is used and shows only short term stability.
Figure 7:
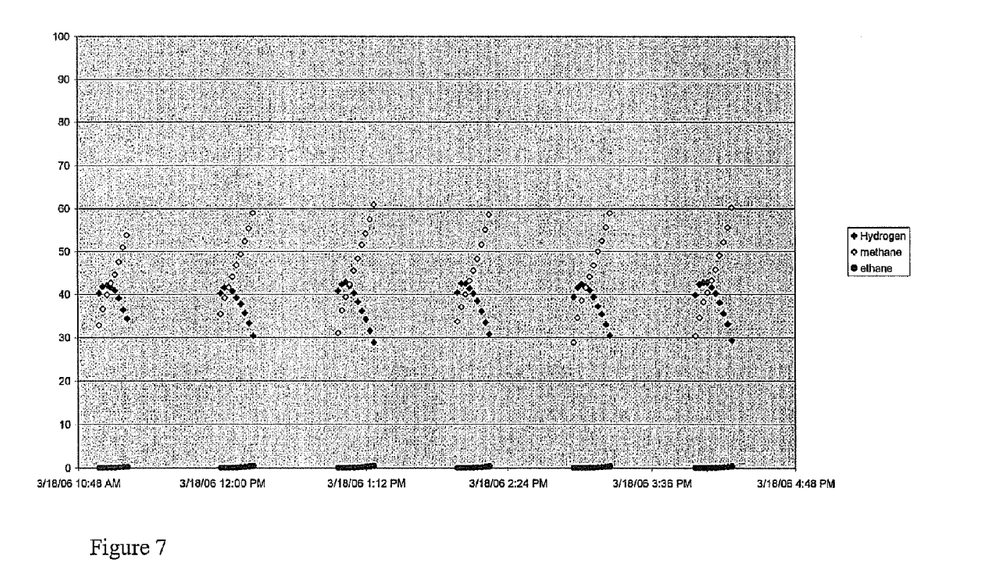
FIG. 7 illustrates a graphical diagram of reformate compositions in methods outside the scope of the invention.

These experiments are in contrast to the same precious metals but deposited on a sulfating support such as $Al_2O_3$. In FIG. 6 reforming process acts of FIG. 3 are applied to a Pt,Rh/$Al_2O_3$ catalyst on Day 1. The y-axis represents the mole % of the reformate products. Compositions are dry gas. FIG. 6 shows the same run conditions as FIG. 4 but with a sulfating support. When using a sulfating support, the initial catalyst performance is good. However, after continuing to repeat the process described in FIG. 3 for 5 days, as shown in FIG. 7, the $H_2$ concentration continues to decrease after each cycle while the increase in gas phase $CH_4$ is indicative of a loss of methane steam reforming activity. While not wishing to be bound by any theory, it is speculated that the $O_2$ purge causes formation of sulfur oxides which irreversibly reacts with the $Al_2O_3$ leading to pore blockage and subsequent deactivation of the catalyst.

In FIG. 7 reforming process acts of FIG. 3 are applied to a Pt,Rh/$Al_2O_3$ on Day 6. The y-axis represents the mole % of the reformate products. Compositions are dry gas. FIG. 7 shows that when the catalyst prepared with a carrier susceptible to sulfating is operated continuously until complete loss of activity ($H_2$ yield) the $O_2$ pulse step is not completely effective in fully regenerating the catalyst since it does not remove all the sulfate $Al_2(SO_4)_3$ formed. This is to be contrasted with the same precious metal components deposited on the non-sulfating carrier which can be completely regenerated as shown in FIGS. 4 and 5.

Figure 8:
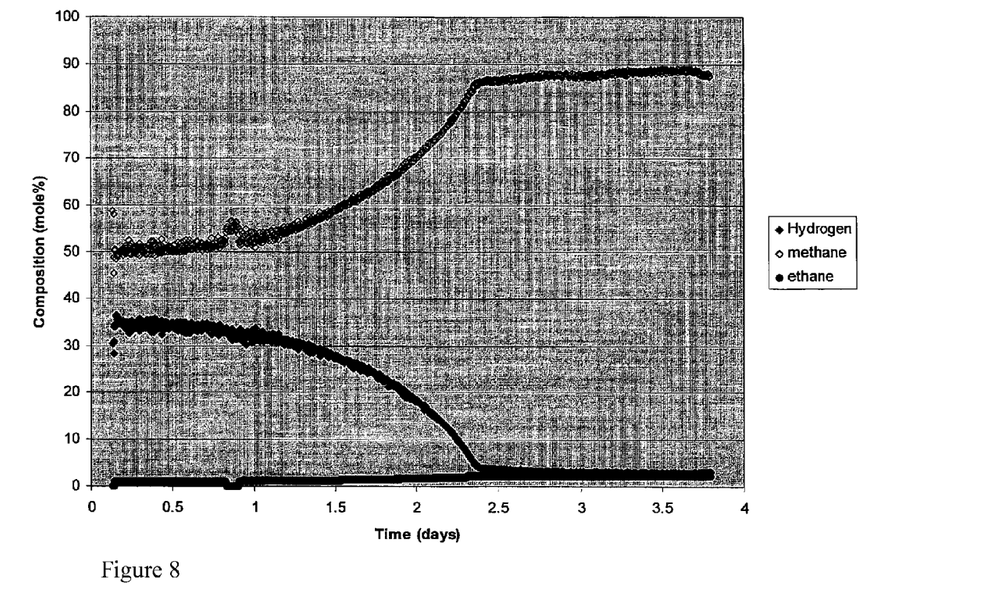
FIG. 8 illustrates a graphical diagram of reformate compositions in methods outside the scope of the invention.
Figure 9:
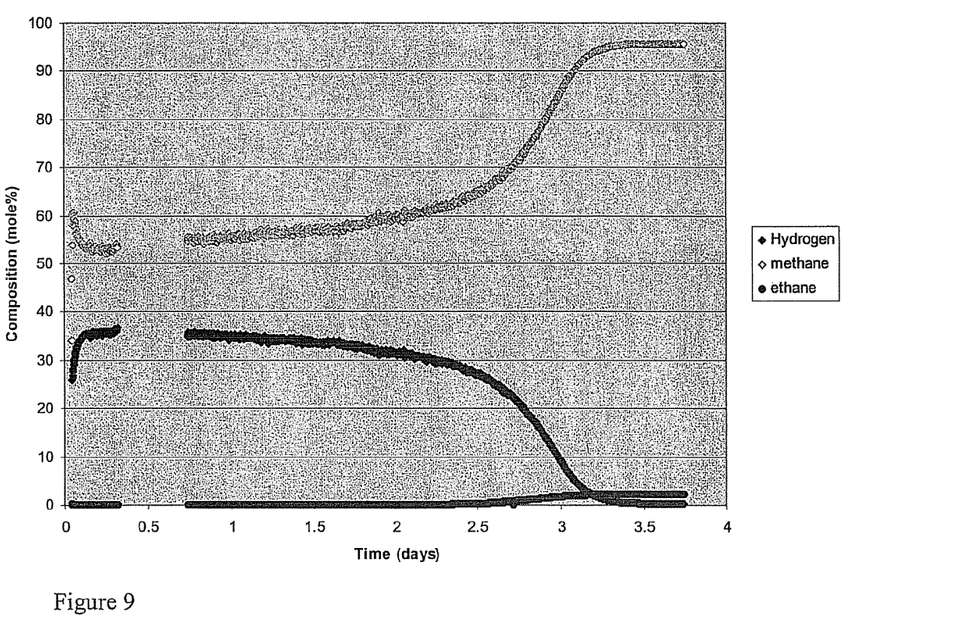
FIG. 9 illustrates a graphical diagram of reformate compositions in methods in accordance with an aspect of the invention.

FIG. 8 demonstrates the effect of continuous exposure to a sulfur containing fuel on the steam reforming activity of a Pt, Rh on $Al_2O_3$. FIG. 9 demonstrates the effect of continuous exposure to sulfur containing fuel on the steam reforming activity of a Pt, Rh on $SiO_2$—$ZrO_2$.

If the process of FIG. 3 is not followed and if natural gas steam reforming in the presence of sulfur is performed under constant fuel/steam flow, the results show monotonically decreasing activity as demonstrated by increasing methane concentration, increasing ethane concentration, and decreasing hydrogen concentration. The data in FIG. 8 are collected at SCR=1.6 with Pt, Rh on $Al_2O_3$, which is a substrate that can form stable sulfate species under these steam reforming conditions. A similar plot is obtained for the sulfur tolerant catalyst of the invention, such as Pt, Rh/$SiO_2$/$ZrO_2$ (FIG. 9) but the level of activity is retained considerably longer. The sulfur capacity of the catalyst can be estimated from the amount of sulfur adsorbed up to the time of extinction of activity.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of reforming a sulfur containing hydrocarbon comprising:
   contacting a sulfur containing hydrocarbon feed with steam and a sulfur tolerant catalyst at a temperature of at least about 300° C. for a predetermined amount of time, so that the sulfur tolerant catalyst adsorbs at least a portion of sulfur in the sulfur containing hydrocarbon feed and reforms said feed, such that a low sulfur reformate is collected; and
   contacting the sulfur tolerant catalyst with a gas comprising oxygen to convert at least a portion of adsorbed sulfur to a sulfur oxide that is desorbed from the sulfur tolerant catalyst;
   wherein
   said sulfur tolerant catalyst consists essentially of a mixture of platinum and rhodium and a non-sulfating carrier.

2. The method of claim 1, wherein contacting the sulfur containing hydrocarbon feed with steam and said sulfur tolerant catalyst comprises high-temperature steam-reforming at temperatures of about 550° C. or more and about 900° C. or less and a pressure of about 1 atmosphere or more.

3. The method of claim 1, wherein contacting the sulfur containing hydrocarbon feed with steam and said sulfur tolerant catalyst comprises moderate temperature pre-reforming at temperatures of about 300° C. or more and about 550° C. or less and a pressure of about 1 atmosphere or more.

4. The method of claim 1, wherein the gas comprising oxygen comprises at least about 5% by volume oxygen.

5. The method of claim 1, wherein the gas comprising oxygen is contacted with the sulfur tolerant catalyst at a temperature of about 200° C. or more and 800° C. or less.

6. The method of claim 1, wherein the low sulfur reformate comprises about 20% or less of an amount of sulfur compounds than the sulfur containing hydrocarbon feed.

7. The method of claim 1, further comprising contacting the sulfur tolerant catalyst with steam to purge combustible gases after contacting the sulfur containing hydrocarbon feed with the sulfur tolerant catalyst and before contacting the sulfur tolerant catalyst with the gas comprising oxygen.

8. The method of claim 7, wherein the sulfur tolerant catalyst is contacted with steam at about 600° C. or less.

9. The method of claim 1, wherein said contacting a sulfur containing hydrocarbon feed with steam and a sulfur tolerant catalyst at a temperature of at least about 300° C. for a predetermined amount of time comprises contacting the sulfur containing hydrocarbon feed with steam to form a mixture and subsequently contacting the mixture with said sulfur tolerant catalyst at a temperature of at least about 300° C. for a predetermined amount of time.

10. A method of continuously reforming a sulfur containing hydrocarbon comprising:
   contacting a sulfur containing hydrocarbon feed from a source with steam and a first sulfur tolerant catalyst in a first chamber at a temperature of at least about 300° C. for a predetermined amount of time so that the first sulfur tolerant catalyst adsorbs at least a portion of sulfur in the sulfur containing hydrocarbon feed and reforms said feed, such that a first low sulfur reformate is collected;
   terminating contact between the sulfur containing hydrocarbon feed from the source and the first sulfur tolerant catalyst in the first chamber after said predetermined amount of time and then contacting the sulfur containing hydrocarbon feed from the source with steam and a second sulfur tolerant catalyst in a second chamber at a temperature of at least about 300° C. for a predetermined amount of time so that the second sulfur tolerant catalyst adsorbs at least a portion of sulfur in the sulfur containing hydrocarbon feed and reforms said feed, such that a second low sulfur reformate is collected; and
   after terminating contact between the sulfur containing hydrocarbon feed from the source and the first sulfur tolerant catalyst in the first chamber, contacting the first sulfur tolerant catalyst with a first gas comprising oxygen to convert at least a portion of adsorbed sulfur to a sulfur oxide that is desorbed from the first sulfur tolerant catalyst;
   wherein said first and second sulfur tolerant catalysts consist essentially of a mixture of platinum and rhodium and a non-sulfating carrier.

11. The method of claim 10, further comprising:
   terminating contact between the sulfur containing hydrocarbon feed from the source and the second sulfur tolerant catalyst in the second chamber after said predetermined amount of time and then contacting the sulfur containing hydrocarbon feed from the source with steam and the first sulfur tolerant catalyst in the first chamber at a temperature of at least about 300° C. for a predetermined amount of time, so that the first sulfur tolerant catalyst adsorbs at least a portion of sulfur in the sulfur containing hydrocarbon feed and reforms said feed, such that a low sulfur reformate is collected; and
   after terminating contact between the sulfur containing hydrocarbon feed from the source and the second sulfur tolerant catalyst in the second chamber, contacting the second sulfur tolerant catalyst with a second gas comprising oxygen to convert at least a portion of adsorbed sulfur to a sulfur oxide that is desorbed from the second sulfur tolerant catalyst.

12. The method of claim 10, wherein the method is conducted in a swing reactor system.

13. The method of claim 10, wherein the sulfur containing hydrocarbon feed comprises
   at least one member selected from the group consisting of sulfur, hydrogen sulfide, carbonyl sulfide, carbon disulfide, thiophenes, mercaptans, sulfur oxides, sulfates, and sulfides; and
   at least one member selected from the group consisting of natural gas, alkanes containing from about 1 to about 12 carbon atoms, alkenes containing from about 1 to about 12 carbon atoms, and aromatics containing from about 1 to about 16 carbon atoms.

14. The method of claim 10, wherein the gas comprising oxygen comprises at least about 20% by volume oxygen.

15. The method of claim 10, wherein the gas comprising oxygen is contacted with the first sulfur tolerant catalyst at a temperature of about 300° C. or more and 700° C. or less.

16. The method of claim 10, wherein the first low sulfur reformate and the second low sulfur reformate comprise less than about 0.1 ppm of sulfur compounds.

17. The method of claim 10, wherein said contacting a sulfur containing hydrocarbon feed with steam and a sulfur tolerant catalyst at a temperature of at least about 300° C. for a predetermined amount of time comprises contacting the sulfur containing hydrocarbon feed with steam to form a mixture and subsequently contacting the mixture with said sulfur tolerant catalyst at a temperature of at least about 300° C. for a predetermined amount of time.

18. The method of claim 13, wherein said aromatics containing from about 1 to about 16 carbon atoms are selected from the group consisting of naphtha, LPGs, diesel, gasoline, fossil fuels, jet fuel, and logistical fuels.

19. The method of claim 1, wherein the non-sulfating carrier is $SiO_2$-$ZrO_2$.

20. The method of claim 10, wherein the non-sulfating carrier is $SiO_2$-$ZrO_2$.

21. The method of claim 9, wherein the mixture has a steam to carbon ratio of about 0.1 to about 10.

22. The method of claim 17, wherein the mixture has a steam to carbon ratio of about 0.1 to about 10.

* * * * *